(12) United States Patent
Hagspiel et al.

(10) Patent No.: US 9,183,042 B2
(45) Date of Patent: *Nov. 10, 2015

(54) INPUT/OUTPUT TRAFFIC BACKPRESSURE PREDICTION

(71) Applicant: International Business Machines Corporation, Armonk, NY (US)

(72) Inventors: Norbert Hagspiel, Wendlingen (DE); Matthias Klein, Boeblingen (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/077,156

(22) Filed: Nov. 11, 2013

(65) Prior Publication Data

US 2014/0089607 A1    Mar. 27, 2014

Related U.S. Application Data

(63) Continuation of application No. 13/624,216, filed on Sep. 21, 2012.

(51) Int. Cl.
   *G06F 9/46*    (2006.01)
   *G06F 13/16*   (2006.01)

(52) U.S. Cl.
   CPC .............. *G06F 9/467* (2013.01); *G06F 13/161* (2013.01)

(58) Field of Classification Search
   CPC . G06F 9/3012; G06F 9/30167; G06F 9/3836; G06F 9/384; G06F 9/3851; G06F 9/3885; G06F 9/3891; G06F 9/3828; G06F 9/30138; G06F 9/5072; G06F 13/161; G06F 9/467; G06F 11/141; G06F 5/06; G06F 9/5088; G06F 12/00

See application file for complete search history.

(56) References Cited

U.S. PATENT DOCUMENTS

| | | | | |
|---|---|---|---|---|
| 4,628,532 A | * | 12/1986 | Stone et al. | 382/197 |
| 4,878,166 A | * | 10/1989 | Johnson et al. | 710/307 |
| 5,381,538 A | * | 1/1995 | Amini et al. | 711/156 |
| 5,887,134 A | * | 3/1999 | Ebrahim | 709/200 |
| 6,415,367 B1 | * | 7/2002 | Baxter et al. | 711/158 |
| 6,622,212 B1 | * | 9/2003 | Tetrick | 711/137 |
| 6,647,438 B1 | * | 11/2003 | Connor et al. | 710/22 |

(Continued)

OTHER PUBLICATIONS

Salapura et al.; Next-Generation Performance Counters: Towards Monitoring over Thousand Concurrent Events; IBM Research Report; Sep. 19, 2007, pp. 1-9.

(Continued)

*Primary Examiner* — Aimee Li
*Assistant Examiner* — Alex Olson
(74) *Attorney, Agent, or Firm* — James L. Baudino

(57) ABSTRACT

According to one aspect of the present disclosure, a method and technique for input/output traffic backpressure prediction is disclosed. The method includes: performing a plurality of memory transactions; determining, for each memory transaction, a traffic value corresponding to a time for performing the respective memory transactions; responsive to determining the traffic value for a respective memory transaction, determining a median value based on the determined traffic values; determining whether successive median values are incrementing; and responsive to a quantity of successively incrementing median values exceeding a threshold, indicating a prediction of a backpressure condition.

12 Claims, 6 Drawing Sheets

(56) References Cited

U.S. PATENT DOCUMENTS

| | | | |
|---|---|---|---|
| 7,010,607 B1* | 3/2006 | Bunton | 709/228 |
| 7,017,020 B2* | 3/2006 | Herbst et al. | 711/167 |
| 7,216,196 B2* | 5/2007 | Jeddeloh | 711/5 |
| 7,984,222 B2* | 7/2011 | Gower et al. | 710/305 |
| 8,136,124 B2* | 3/2012 | Kosche et al. | 719/318 |
| 8,429,120 B1* | 4/2013 | Patel | 707/607 |
| 2003/0028694 A1* | 2/2003 | Aboulenein et al. | 710/107 |
| 2003/0233497 A1* | 12/2003 | Shih | 710/22 |
| 2004/0123067 A1* | 6/2004 | Sprangle et al. | 711/204 |
| 2004/0205298 A1* | 10/2004 | Bearden et al. | 711/137 |
| 2004/0237003 A1* | 11/2004 | Adkisson | 714/47 |
| 2006/0174228 A1* | 8/2006 | Radhakrishnan et al. | 717/127 |
| 2006/0288130 A1* | 12/2006 | Madukkarumukumana et al. | 710/22 |
| 2007/0088861 A1* | 4/2007 | Dudley et al. | 710/15 |
| 2007/0283125 A1* | 12/2007 | Manczak et al. | 711/207 |
| 2008/0034148 A1* | 2/2008 | Gower et al. | 711/5 |
| 2009/0182945 A1* | 7/2009 | Aviles et al. | 711/122 |
| 2011/0209155 A1* | 8/2011 | Giampapa et al. | 718/103 |
| 2011/0320846 A1* | 12/2011 | David et al. | 713/340 |
| 2013/0031556 A1* | 1/2013 | Branson et al. | 718/103 |
| 2013/0086325 A1* | 4/2013 | Kim | 711/122 |

OTHER PUBLICATIONS

Eranian, Stephane; What can performance counters do for memory subsystem analysis?; MSPC '08 Proceedings of the 2008 ACM SIGPLAN workshop on memory systems performance and correctness (held in conjunction with the Thirteenth International Conference on Architectural Support for Programming Languages and Operating Systems (ASPLOS '08)); Mar. 2, 2008; pp. 26-30.

* cited by examiner

| TRANSACTION (T) | LATENCY VALUE | MEDIAN VALUE |
|---|---|---|
| $T_0$ | 0 | 0 |
| $T_1$ | 16 | 1 |
| $T_2$ | 20 | 2 |
| $T_3$ | 20 | 3 |
| $T_4$ | 18 | 4 |
| $T_5$ | 16 | 5 |
| ... | ... | ... |
| $T_{10}$ | 17 | 16 |
| $T_{11}$ | 17 | 17 |
| $T_{12}$ | 17 | 17 |
| $T_{13}$ | 20 | 18 |
| $T_{14}$ | 23 | 19 |
| $T_{15}$ | 15 | 18 |
| ... | ... | ... |
| $T_{30}$ | 23 | 20 |
| $T_{31}$ | 25 | 21 |
| $T_{32}$ | 29 | 22 |
| $T_{33}$ | 28 | 23 |
| $T_{34}$ | 30 | 24 |
| $T_{35}$ | 35 | 25 |
| $T_{36}$ | 33 | 26 |
| $T_{37}$ | 40 | 27 |

FIG. 4

INPUT/OUTPUT TRAFFIC BACKPRESSURE PREDICTION

BACKGROUND

Computer or data processing systems generally include a number of memory devices (e.g., dynamic random access memory (DRAM) devices), which are connected to one or more processors via one or more memory control elements and/or data buses. The computer system may also include a number of memory caches, input/output (I/O) units or subsystems, and other devices accessing and/or performing operations relative to the various memory devices. Thus, performance of the computer system is oftentimes measured in terms of the time needed to perform various memory transactions, such as store or fetch operations. For example, the available bandwidth between memory devices and/or processors and the arbitration processes being undertaken with respect to memory accesses can impact computer system performance.

BRIEF SUMMARY

According to one aspect of the present disclosure a method and technique for input/output traffic backpressure prediction is disclosed. The method includes: performing a plurality of memory transactions; determining, for each memory transaction, a traffic value corresponding to a time for performing the respective memory transactions; responsive to determining the traffic value for a respective memory transaction, determining a median value based on the determined traffic values; determining whether successive median values are incrementing; and responsive to a quantity of successively incrementing median values exceeding a threshold, indicating a prediction of a backpressure condition.

BRIEF DESCRIPTION OF THE SEVERAL VIEWS OF THE DRAWINGS

For a more complete understanding of the present application, the objects and advantages thereof, reference is now made to the following descriptions taken in conjunction with the accompanying drawings, in which:

FIG. 4 is a diagram illustrating various data measurements performed by the system of FIG. 3 in accordance with an embodiment of the present disclosure;

DETAILED DESCRIPTION

Figure 1:
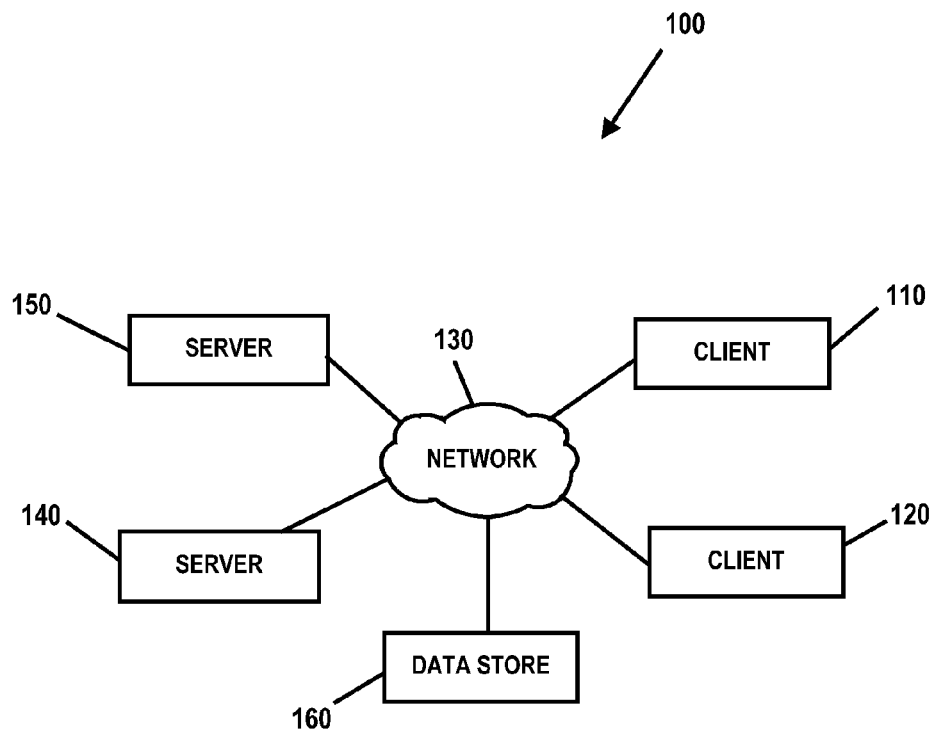
FIG. 1 is an embodiment of a network of data processing systems in which the illustrative embodiments of the present disclosure may be implemented.

Embodiments of the present disclosure provide a method, system and computer program product for input/output traffic backpressure prediction. For example, in some embodiments, the method and technique includes: performing a plurality of memory transactions; determining, for each memory transaction, a traffic value corresponding to a time for performing the respective memory transactions; responsive to determining the traffic value for a respective memory transaction, determining a median value based on the determined traffic values; determining whether successive median values are incrementing; and responsive to a quantity of successively incrementing median values exceeding a threshold, indicating a prediction of a backpressure condition. Thus, embodiments of the present disclosure enable an early indication of impending or upcoming backpressure conditions to thereby facilitate a determination of a root case of the traffic condition. For example, embodiments of the present disclosure enable traffic latencies and data bus utilization to be measured and compared against threshold values. Further, embodiments of the present disclosure measure changes to the latency and/or utilization values by deriving and/or determining a median value representing changes (or rates of changes) to the latency and/or utilization values. Changes to the median value over a series of memory transactions may be evaluated such that steady or continuous increases in the median value are used to predict traffic backpressure conditions.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer usable or computer readable medium(s) may be utilized. The computer readable medium may be a computer readable signal medium or a computer readable storage medium. A computer readable storage medium may be, for example but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 2:
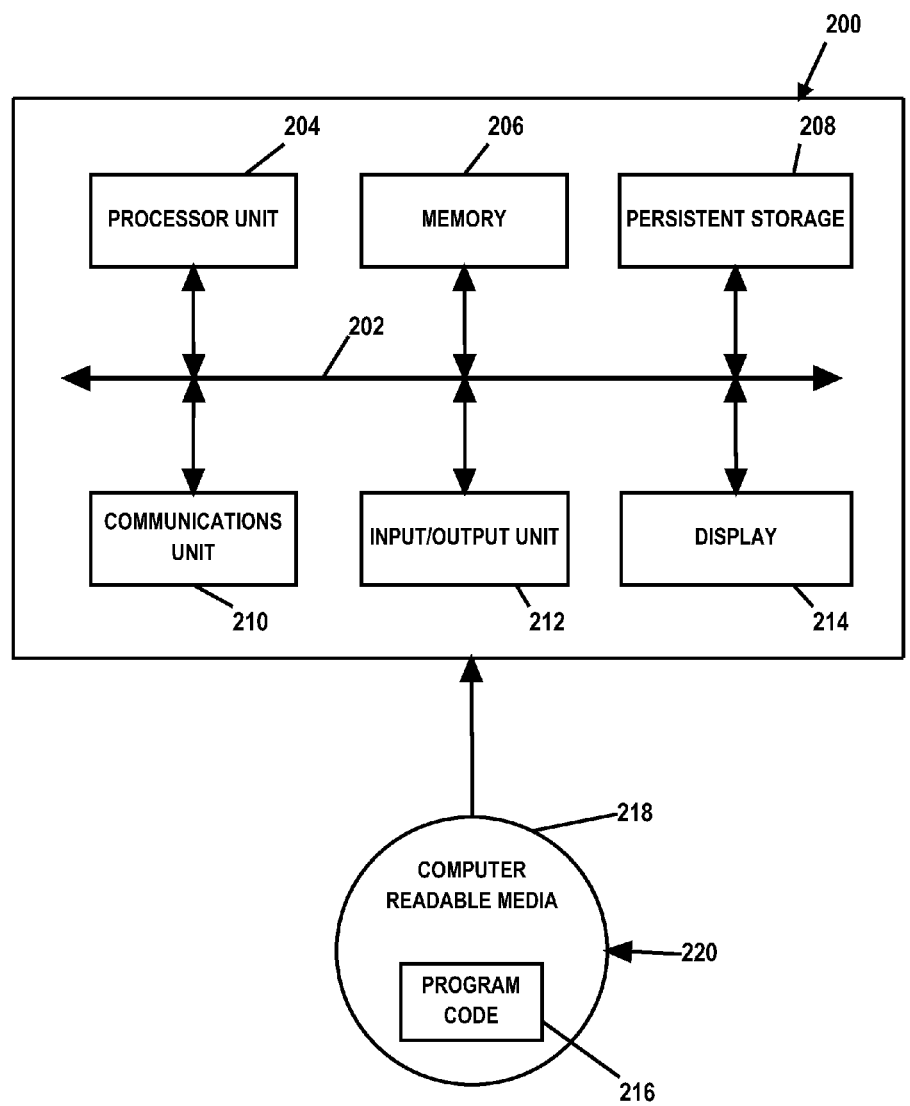
FIG. 2 is an embodiment of a data processing system in which the illustrative embodiments of the present disclosure may be implemented.

With reference now to the Figures and in particular with reference to FIGS. 1-2, exemplary diagrams of data processing environments are provided in which illustrative embodiments of the present disclosure may be implemented. It should be appreciated that FIGS. 1-2 are only exemplary and are not intended to assert or imply any limitation with regard to the environments in which different embodiments may be implemented. Many modifications to the depicted environments may be made.

FIG. 1 is a pictorial representation of a network of data processing systems in which illustrative embodiments of the present disclosure may be implemented. Network data processing system 100 is a network of computers and/or computing or data processing devices in which the illustrative embodiments of the present disclosure may be implemented. Network data processing system 100 contains network 130, which is the medium used to provide communications links between various devices and computers connected together within network data processing system 100. Network 130 may include connections, such as wire, wireless communication links, or fiber optic cables.

In some embodiments, server 140 and server 150 connect to network 130 along with data store 160. Server 140 and server 150 may be, for example, IBM® Power Systems™ servers. In addition, clients 110 and 120 connect to network 130. Clients 110 and 120 may be, for example, personal computers or network computers. In the depicted example, server 140 provides data and/or services such as, but not limited to, data files, operating system images, and applications to clients 110 and 120. Network data processing system 100 may include additional servers, clients, and other devices.

In the depicted example, network data processing system 100 is the Internet with network 130 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), a wide area network (WAN), a telephone switching infrastructure, etc. FIG. 1 is intended as an example, and not as an architectural limitation for the different illustrative embodiments.

FIG. 2 is an embodiment of a data processing system 200 such as, but not limited to, client 110 and/or server 140 in which an embodiment of a system for input/output traffic backpressure prediction according to the present disclosure may be implemented. In this embodiment, data processing system 200 includes a bus or communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

In some embodiments, memory 206 may be a random access memory or any other suitable volatile or non-volatile storage device. Persistent storage 208 may take various forms depending on the particular implementation. For example, persistent storage 208 may contain one or more components or devices. Persistent storage 208 may be a hard drive, a flash memory, a rewritable optical disk, a rewritable magnetic tape, or some combination of the above. The media used by persistent storage 208 also may be removable such as, but not limited to, a removable hard drive.

Communications unit 210 provides for communications with other data processing systems or devices. In these examples, communications unit 210 is a network interface card. Modems, cable modem and Ethernet cards are just a few of the currently available types of network interface adapters. Communications unit 210 may provide communications through the use of either or both physical and wireless communications links.

Input/output unit 212 enables input and output of data with other devices that may be connected to data processing system 200. In some embodiments, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer readable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. For example, a storage device in data processing system 200 is any hardware apparatus that may store data. Memory 206, persistent storage 208, and computer readable media 218 are examples of storage devices in a tangible form.

Figure 3:
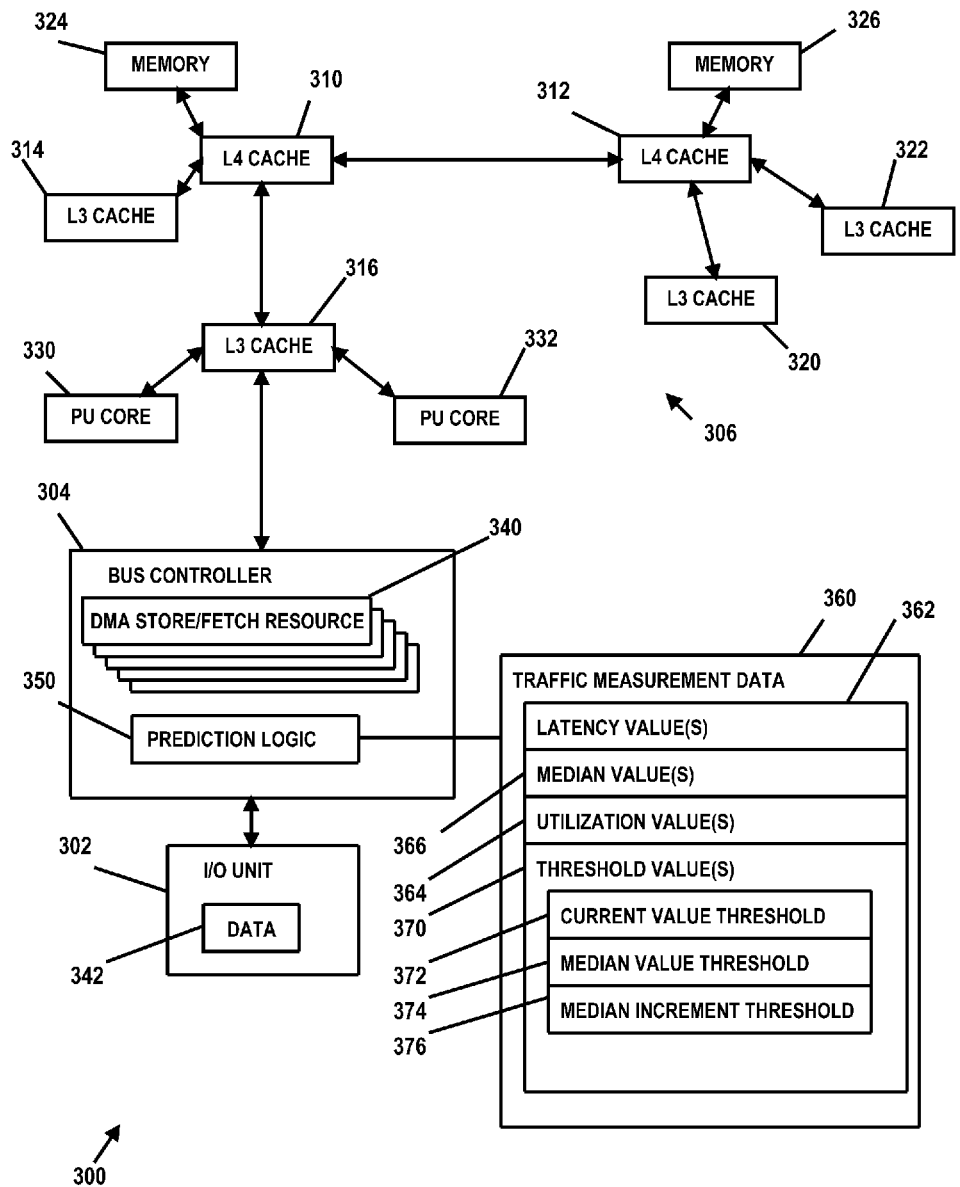
FIG. 3 is a diagram illustrating an embodiment of a data processing system in which illustrative embodiments of an input/output traffic backpressure prediction system according to the present disclosure may be implemented.

FIG. 3 is an illustrative embodiment of a system 300 for input/output traffic backpressure prediction. System 300 may be implemented on data processing systems or platforms such as, but not limited to, servers 140 and/or 150, clients 110 and/or 120, or at other data processing system locations. In the embodiment illustrated in FIG. 3, system 300 comprises an input/output (I/O) unit 302 and a bus controller 304 coupled to one or more memory components and/or subsystems 306. For example, in the illustrated embodiment, system 300 includes L4 cache memories 310 and 312, L3 cache memories 314 and 316 coupled to L4 cache memory 310, L3 cache memories 320 and 322 coupled to L4 cache memory 312, main memory 324 coupled to L4 cache memory 310, and main memory 326 coupled to L4 cache memory 312. It should be understood that the types and/or quantities of memory components and/or subsystems may be varied. In the illustrated embodiment, two processor unit cores 330 and 332 are coupled to L3 cache memory 316. It should be understood that other and/or additional processor units as well as other types of components may be coupled to and/or have access to various components of memory subsystem 306.

Bus controller 304 is configured for performing and/or otherwise controlling data input/output operations or transactions relative to various memory components and/or subsystems. For example, in the illustrated embodiment, bus controller 304 includes one or more direct memory access (DMA) store/fetch resources 340 which may comprise state machines and associated buffers for holding data 342 received from and/or being transferred to I/O unit 302 and corresponding memory subsystems 306 via one or more data buses. In a store memory transaction, for example, the DMA store resources 340 are configured to hold data received from I/O unit 302 until the data can be sent to a memory subsystem 306 component connected directly to the DMA store resource 340 (e.g., L3 cache memory 316). For example, when a request to store data is sent to L3 cache memory 316, the L3 cache memory 316 has to send a request to the system in order to get the store line exclusivity where the line is located. When the line is found (e.g., in a remote L4 cache memory 310), the L3 cache memory 316 will receive a response that the L3 cache memory 316 has exclusivity with respect to the line. When this information arrives at L3 cache memory 316, L3 cache memory 316 in turn sends a response to the DMA store resource 340 that the data can be transferred and stored to L3 cache memory 316, and the store transaction is thereafter completed. Bus controller 304 and I/O unit 302 may be implemented in any suitable manner using known techniques that may be hardware-based, software-based, or some combination of both. For example, bus controller 304 and/or I/O unit 302 may comprise software, logic and/or executable code for performing various functions as described herein (e.g., residing as software and/or an algorithm running on a processor unit, hardware logic residing in a processor or other type of logic chip, centralized in a single integrated circuit or distributed among different chips in a data processing system).

Embodiments of the present disclosure provide a system, method and technique for measuring performance of I/O data memory transactions by evaluating latency and/or data bus utilization. Latency generally refers to an amount of time between two actions (e.g., the amount of time that a single fetch or store transaction takes to complete). Data bus utilization generally refers to how often and/or how long a data bus is busy or utilized, which may translate to data bus bandwidth. Embodiments of the present disclosure evaluate various latency and/or utilization characteristics to predict backpressure or upcoming/anticipated data traffic hangs (e.g., a buildup of data because a resource(s) in the memory system cannot receive data or cannot send back requested data), thereby enabling easier analysis and/or determination of a root cause of a data traffic problem.

In the illustrated embodiment, bus controller 304 includes prediction logic 350 for measuring and/or analyzing various latency and/or utilization characteristics of data I/O transactions. Although in the illustrated embodiment prediction logic 350 is illustrated as being part of bus controller 304, it should be understood that prediction logic 350 may be otherwise configured and/or located. Prediction logic 350 may be implemented in any suitable manner using known techniques that may be hardware-based, software-based, or some combination of both. For example, prediction logic 350 may comprise software, logic and/or executable code for performing various functions as described herein (e.g., residing as software and/or an algorithm running on a processor unit, hardware logic residing in a processor or other type of logic chip, centralized in a single integrated circuit or distributed among different chips in a data processing system).

As indicated above, prediction logic 350 is configured to monitor, measure and/or evaluate latency and/or utilization characteristics associated with I/O memory transactions to predict backpressure conditions. In FIG. 3, prediction logic 350 may determine, record and/or analyze various types of traffic measurement data 360 corresponding to I/O memory transactions related to memory subsystem 306 components. For example, in the illustrated embodiment, traffic measurement data 360 includes traffic latency values 362, traffic utilization values 364, and traffic median values 366. Traffic latency values 362 are values corresponding to an amount of time associated with one or more memory I/O transactions (e.g., the amount of time for a memory transaction to complete, the amount of time between memory transactions, etc.). For example, a traffic latency value 362 corresponding to a particular memory transaction may reflect an amount of time between a request made to store data to a memory component (e.g., L3 cache memory 316) and a confirmation or acknowledgment of completion of the storage transaction. In some embodiments, traffic latency values 362 may be measured based on a quantity of clock cycles between a rising edge and a falling edge of a clock signal. However, it should be understood that traffic latency values 362 may be otherwise measured (e.g., an actual time measurement or otherwise). It should also be understood that the traffic latency value 362 may also correspond to a memory fetch transaction. Traffic utilization values 364 correspond to an amount of time that a resource is busy within a certain time period. In some embodiments, traffic utilization values 364 may be measured based on a quantity of clock cycles occurring while a resource is busy. However, it should be understood that traffic utilization values 364 may be otherwise defined (e.g., an actual time measurement or otherwise).

Median values 366 represent a median or average value corresponding to latency values 362 and/or utilization values 364. Median values 366 may comprise an arithmetic average corresponding to a plurality of latency values 362 and/or utilization values 364 or may comprise a non-arithmetic value representing the degree of stabilization of latency values 362 and/or utilization values 364. For example, in some embodiments, median values 366 may be computed and/or derived based on a series of latency values 362 and/or utilization values 364 such that median values 366 indicate the degree of stabilization of latency and/or utilization characteristics. In some embodiments, a median value 366 is computed in response to the acquisition of each successive latency value 362 and/or utilization value 364 based on previously acquired latency values 362 and/or utilization values 364. For example, one characteristic of a stable system is that median value 366 remains relatively constant (e.g., only insignificant deviations from some value) over time, while a characteristic of an unstable system caused by upcoming or impending backpressure will result in a steady or continuous increase over time of median value 366 (e.g., 1024 times in a row).

Threshold values 370 comprise base levels or thresholds against which latency values 362, utilization values 364 and/or median values 366 are compared to predict the likelihood of a backpressure condition. In the illustrated embodiment, threshold values 370 comprise a maximum value threshold 372, a median value threshold 374 and a median increment threshold 376. Maximum value threshold 372 may comprise a value such that if a particular latency value 362 or utilization value 364 exceeds maximum value threshold 372, an indication of a backpressure condition is indicated. Median value threshold 374 represents a value such that if a particular median value 366 exceeds median value threshold 374, an indication of a backpressure condition is indicated. Median increments threshold 376 comprises a value corresponding to a maximum quantity of successive increments to median value 366 such that if a series of successive median values 366 increment each time for some quantity that exceeds median increments threshold 376, an indication of a backpressure condition is indicated. Thus, for example, if the computed median value 366 computed after each acquisition of a respective latency value 362 and/or utilization value 364 steadily increases over time for some quantity of occurrences that exceed median increment threshold 376, an indication of a backpressure condition is generated.

In operation, in response to each memory transaction, prediction logic 350 measures and/or acquires data traffic measurement data 360 corresponding to the memory transaction. For example, for a data storage memory transaction, prediction logic 350 measures an amount of time or a value representing an amount of time it takes to complete the storage transaction (e.g., the amount of time from the initiation of a storage request from a DMA store/fetch resource 340 until an acknowledgment or receipt of confirmation of data storage is received by the respective DMA store/fetch resource 340). The measurement data may be in the form of a latency value 362 and/or a utilization value 364. The latency value 362 and/or utilization value 364 is then compared to maximum value threshold 372 (e.g., there may be different maximum threshold values for each of determined latency values 362 or utilization values 364). If the determined latency value 362 or utilization value 364 exceeds a corresponding maximum value threshold 372, an indication of a backpressure condition is generated.

Responsive to acquiring and/or determining a latency value 362 or utilization value 364, prediction logic 350 also computes and/or otherwise determines a corresponding median value 366 for the measured characteristic. For example, after the acquisition of each latency value 362, prediction logic 350 computes a median latency value 366. Similarly, after the acquisition of each utilization value 364, prediction logic 350 may determine and/or compute a median utilization value 366. Each respective median value 366 is then compared to median value threshold 374. If a respective median value 366 exceeds median value threshold 374, an indication of a backpressure condition is generated.

Further, prediction logic 350 also evaluates successively generated median values 366 to determine whether there is a steady increase or decrease in median values 366. For example, with respect to acquired latency values 362, as each latency value 362 is required, a median value 366 is generated based on the acquired latency values 362. Prediction logic 350 evaluates successive median values 366 to determine whether successive median values 366 are increasing or decreasing. Prediction logic 350 tracks a quantity of repeated increases to median values 366 and compares the tracked quantity to median increment threshold 376. If the tracked quantity of repeated increases to median values 366 exceeds median increment threshold 376, an indication of a backpressure condition is generated.

FIG. 4 is a diagram illustrating a series of latency values 362 and median values 366 corresponding to a series of memory transactions ($T_0$-$T_{37}$). In the illustrated embodiment, latency values 362 are represented as a cycle count; however, it should be understood that latency values 362 may be otherwise represented. Further, in the illustrated embodiment, median values 366 comprise a value representing a degree of stabilization of latency values 362 (e.g., not an arithmetic average of acquired latency values 362); however, it should be understood that median values 366 may be otherwise represented. In the illustrated embodiment, $T_0$ represents an initial system activation prior to the measurement of any actual memory transactions such that corresponding latency value 362 is zero and corresponding median value 366 is zero. At memory transaction $T_1$, a latency value 362 of sixteen is derived (e.g., corresponding to a time period for performing a storage or fetch memory transaction). In this embodiment, the current median value 366 or the median value 366 based on the previous transaction (i.e., the median value as of transaction $T_0$) is compared by prediction logic 350 to the current latency value 362 for transaction $T_1$. If the current latency value 362 is greater than or less than the current median value 366 or the median value 366 based on the previous transaction, the median value 362 is incremented or decremented by one, respectively. Thus, in this example, since the latency value 362 for transaction $T_1$ is greater than the median value 366 as of transaction $T_0$, the median value 366 is incremented from zero to one for transaction $T_1$. For transaction $T_2$, a latency value 362 of twenty is measured. Correspondingly, because the latency value 362 of transaction $T_2$ is greater than the median value 366 as of transaction $T_1$, median value 366 is incremented by one for transaction $T_2$. For transaction $T_3$, although there was no change in the latency value 362 relative to transaction $T_2$, the latency value 362 for transaction $T_3$ is greater than the median value 366 as of transaction $T_2$ and, therefore, the median value 366 is incremented by one for transaction $T_3$. For transaction $T_4$, the latency value 362 decreased to eighteen. However, because the latency value 362 for transaction $T_4$ is greater than the median value 366 as of transaction $T_3$, the median value 366 is incremented by one for transaction $T_4$. Transactions $T_0$-$T_5$ may represent, for example, latency values 362 and median values 366 derived at and/or resulting from machine initiation.

Latency values 362 and median values 366 corresponding to transactions $T_{10}$-$T_{15}$ may represent a relatively stable latency condition of a machine such that median values 366 remain substantially constant (or within some range of values) with median value 366 being incremented or decremented based on respective latency values 362 (or remaining unchanged if the latency value 362 for a current transaction is the same as or is equal to (or substantially equal to) the median value 366 as of the previous transaction, such as for transaction $T_{12}$). However, for transactions $T_{30}$-$T_{37}$, increases in latency values 362 cause successive increases in median values 366. For example, the latency values 362 for each of transactions T30-T37 are greater than a median value as of each immediately preceding transaction, thereby causing successive increments to median values 366. The successive increases and/or continuous increase in median values 366 is used as an indication or prediction of a backpressure condition. For example, prediction logic 350 may analyze the quantity of successive median value 366 increments and, if the quantity of successive median value 366 increments exceed threshold 376, an alert corresponding to predicted backpressure may be generated. Additionally, each latency value 362 and/or median value 366 may be evaluated against a respective threshold 372 and/or 374 for predicting a backpressure condition and generating an alert thereof.

Therefore, as illustrated in FIG. 4, median value 366 is derived based on changes in successive latency values 362, and a series of median values 366 may be evaluated to determine whether median values 366 are stable, increasing, or decreasing. If median values 366 are steadily increasing, prediction logic 350 may generate an alert indicating a backpressure condition. As described above, latency values 362 and median values 366 may be compared to maximum value threshold 372, median value threshold 374, and median increment threshold 376 to predict backpressure conditions. The derivation and/or evaluation of latency values 362 and/or median values 366 may be performed using hardware and/or using a software algorithm.

Figure 5:
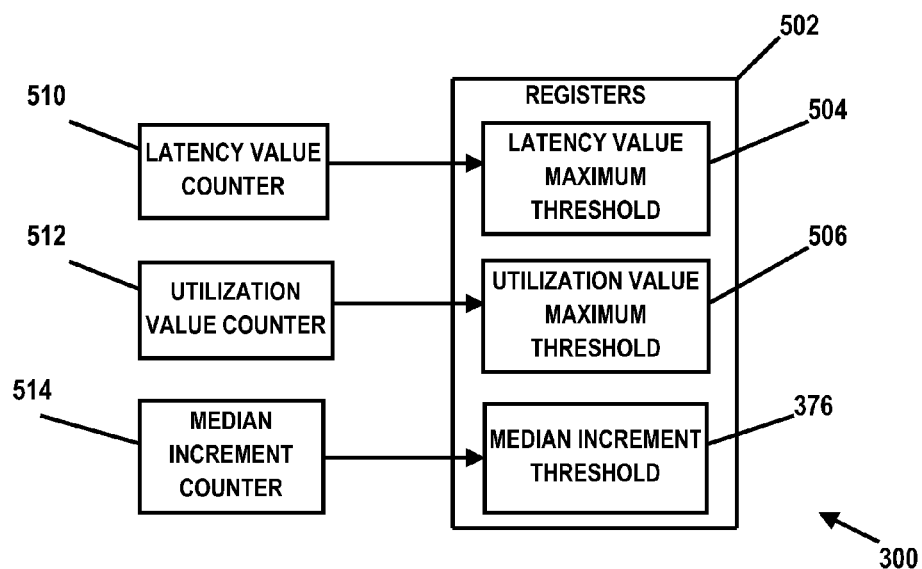
FIG. 5 is a diagram illustrating various components of the system of FIG. 3 in accordance with an embodiment of the present disclosure.

FIG. 5 is a diagram illustrating an embodiment of various functional components of system 300 in accordance with the present disclosure. In the illustrated embodiment, system 300 comprises programmable registers 502 that may contain desired values corresponding to a latency value maximum threshold 504, a utilization value maximum threshold 506, and median increment threshold 376. System 300 may also comprise a latency value counter 510, a utilization value counter 512 and a median increment counter 514. Latency value counter 510 and utilization value counter 512 may be configured to count a quantity of clock cycles for respective memory transactions. The value determined by latency value counter 510 and utilization value counter 512 may be compared to respective thresholds 504 and 506 such that if the count value derived by counters 510 and 512 exceed thresholds 504 or 506, an indication of a backpressure condition is generated. Median increment counter 514 may be configured to count a quantity of successive increases in the median value 366. The quantity of successive increases in median value 366 may be compared to median increment threshold 376 such that if the count value or quantity of successive increments to median value 366 exceeds median increment threshold 376, an indication of a backpressure conditions is generated.

Figure 6:
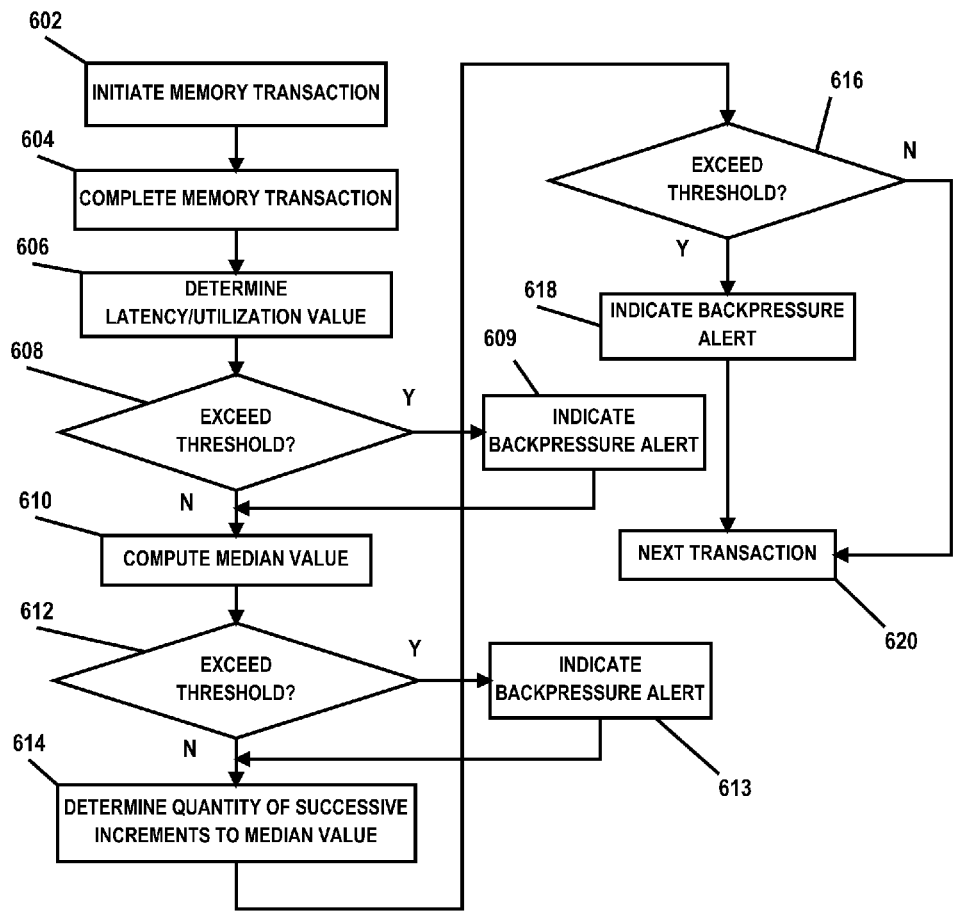
FIG. 6 is a flow diagram illustrating an embodiment of a method for input/output traffic backpressure prediction in accordance with an embodiment of the present disclosure.

FIG. 6 is a flow diagram illustrating an embodiment of a method for input/output traffic backpressure prediction. The method begins at block 602, where a memory transaction is initiated. At block 604, the memory transaction is completed. At block 606, prediction logic 350 determines, computes and/or otherwise derives latency value 362 and/or utilization value 364 corresponding to the memory transaction. At decisional block 608, a determination is made whether the determined latency value 362 and/or utilization value 364 exceeds a respective maximum value threshold 372. If not, the method proceeds to block 610. If the determined latency value 362 and/or utilization value 364 exceeds a respective maximum value threshold 372, the method proceeds to block 609, where an indication or alert of a backpressure condition is generated. The method then proceeds to block 610.

At block 610, prediction logic 350 computes and/or otherwise derives median value 366 based on one or more previously acquired latency values 362 and/or utilization values 364. At decisional block 612, a determination is made whether the determined median value 366 exceeds median value threshold 374. If not, the method proceeds to block 614. If the determined median value 366 exceeds median value threshold 374, the method proceeds to block 613, where an indication or alert of a backpressure condition is generated. The method then proceeds to block 614.

At block 614, prediction logic 350 determines a quantity of successive increases or increments to median value 366. At decisional block 616, a determination is made whether the quantity of successive increments to median value 366 exceeds median increment threshold 376. If not, the method proceeds to block 620, where the next transaction is evaluated. If it is determined at decisional block 616 that the quantity of successive increments to median value 366 exceeds median increment threshold 376, the method proceeds to block 618, where an indication or alert of a backpressure condition is generated. The method then proceeds to block 620.

It should be understood that the above-described method may be varied to include, or omit, various evaluations relative to latency values 362, utilization values 364 and/or median values 366. For example, in some applications, a user and/or system administrator may opt to analyze only successive increments in median values 366 to predict a backpressure condition (i.e., omitting individual latency value 362 and/or utilization value 366 evaluations relative to thresholds 372). In other embodiments, a user and/or administrator may select to track and analyze latency values 362 and not utilization values 364 to predict backpressure conditions (or evaluate both). Thus, it should be understood that many modifications and variations may be made to the above-described method without departing from the scope and spirit of the disclosure.

Thus, embodiments of the present disclosure enable an early indication of impending or upcoming backpressure conditions to thereby facilitate a determination of a root case of the traffic condition. For example, embodiments of the present disclosure enable traffic latencies and data bus utilization to be measured and compared against threshold values. Further, embodiments of the present disclosure measure changes to the latency and/or utilization values by deriving and/or determining a median value representing changes (or rates of changes) to the latency and/or utilization values. Changes to the median value over a series of memory transactions may be evaluated such that steady or continuous increases in the median value are used to predict traffic backpressure conditions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method, comprising:
   performing a plurality of memory transactions;
   determining, for each memory transaction, a traffic value corresponding to a time for performing the respective memory transactions;
   responsive to determining the traffic value for a respective memory transaction, determining a median value based on the determined traffic values;
   determining whether successive median values are incrementing; and
   responsive to a quantity of successively incrementing median values exceeding a threshold, indicating a prediction of a backpressure condition.

2. The method of claim 1, wherein determining the traffic value comprises determining a latency value.

3. The method of claim 1, wherein determining the traffic value comprises determining a bus utilization value.

4. The method of claim 1, further comprising:
   determining an amount of increment between successively incrementing median values; and
   responsive to determining that the amount exceeds a threshold, indicating a prediction of a backpressure event.

5. The method of claim 1, wherein determining the traffic value comprises determining the time between two actions during a memory transaction.

6. The method of claim 1, wherein performing the plurality of memory transactions comprises performing a plurality of memory storage transactions.

7. The method of claim 1, wherein determining the traffic value comprises determining the time of data bus utilization corresponding to the memory transaction.

8. A method, comprising:
   initiating a traffic counter for each of a plurality of memory transactions to determine a traffic counter value corresponding to a time for performing the respective memory transactions;
   comparing a median counter value corresponding to previous memory transactions with a current traffic counter value;
   responsive to determining that the current traffic counter value is greater than the median counter value, incrementing the median value;
   determining a quantity of successively incrementing median counter values; and responsive to determining that the quantity exceeds a threshold, indicating a prediction of a backpressure condition.

9. The method of claim 8, further comprising, responsive to determining that the current traffic counter value is less than the median counter value, decrementing the median counter value.

10. The method of claim 8, further comprising:
comparing the median counter value to a threshold; and
responsive to the median counter value exceeding the threshold, indicating a prediction of a backpressure condition.

11. The method of claim 8, wherein determining the traffic counter value comprises determining a quantity of cycles for performing the memory transaction.

12. The method of claim 11, wherein determining the traffic counter value comprises determining a quantity of cycles for performing a memory storage transaction.

* * * * *